United States Patent [19]

Tseng et al.

[11] Patent Number: 5,567,786
[45] Date of Patent: Oct. 22, 1996

[54] POLYMERIZABLE COMPOSITION OF VINYLPYRROLIDONE AND VINYL CAPROLACTAM

[75] Inventors: Susan Y. Tseng, Staten Island, N.Y.; Philip F. Wolf, Bridgewater, N.J.

[73] Assignee: ISP Investments Inc., Wilmington, Del.

[21] Appl. No.: 595,902

[22] Filed: Feb. 6, 1996

[51] Int. Cl.⁶ .............................. C08F 226/10; C08F 2/00
[52] U.S. Cl. ................................ 526/264; 526/88
[58] Field of Search ......................... 526/264, 88

[56] References Cited

U.S. PATENT DOCUMENTS 5,360,883  11/1994  Tseng et al. ..................... 526/264

Primary Examiner—Joseph L. Schofer
Assistant Examiner—Wu C. Cheng
Attorney, Agent, or Firm—Walter Katz; Marilyn J. Maue; Joshua J. Ward

[57] ABSTRACT

A polymerizable composition consisting essentially of about 50 to about 90% by weight of vinylpyrrolidone monomer, about 10 to about 50% by weight of vinyl caprolactam monomer, and about 0.5 to about 7% by weight of a crosslinker, which is capable of proliferous polymerization in the absence of base at about 80°–120° C.

8 Claims, No Drawings

POLYMERIZABLE COMPOSITION OF VINYLPYRROLIDONE AND VINYL CAPROLACTAM

BACKGROUND OF THE INVENTION

1. Field of the Invention

This invention relates to a polymerizable composition useful for making crosslinked copolymers of vinylpyrrolidone and vinyl caprolactam, and, more particularly, to a process for making such crosslinked copolymer by proliferous polymerization in the absence of base.

2. Description of the Prior Art

Crosslinked polyvinylpyrrolidone (PVP) is made by popcorn or proliferous polymerization of vinylpyrrolidone (VP), in the absence or presence of crosslinking agents, as described in U.S. Pat. Nos. 3,277,066; 3,306,886; 3,759,880; 3,933,766; and 3,992,562; and by F. Haaf et al. in Polymer J. 17(1), p. 143–152 (1985), in an article entitled, "Polymers of N-Vinylpyrrolidone: Synthesis, Characterization and Uses". Polymerization of vinylpyrrolidone can occur in the absence of added crosslinker because the requisite crosslinker in the process is formed in situ during the first stage heating of vinylpyrrolidone in aqueous caustic solutions at temperatures >100° C., e.g. at 140° C. These in situ crosslinkers have been identified by gas chromatography and other analytical techniques as 1-vinyl-3-ethylidene pyrrolidone and ethylidene-bis-3-(N-vinylpyrrolidone). These compounds also are believed to be present in very small amounts in reaction mixtures which had been cooled to room temperature. However, after the polymerization was completed, these bifunctional compounds could not be found in the final polymer product. Accordingly, the named bifunctional monomers have been considered to be present only in small amounts during the polymerization and consumed in the process of forming the crosslinked PVP polymer.

Tseng, S. and Wolf, P. in U.S. Pat. Nos. 5,274,120; 5,286,876; 5,360,883; 5,342,964; 5,391,668; and 5,393,854, described the preparation of the isomeric compound 1-vinyl-3(E)-ethylidene pyrrolidone (EVP) in a purity of at least 95%, in the form of white, needle-shaped crystals having a melting point of 59°–61° C., and a polymerizable composition including EVP as crosslinker for making crosslinked polyvinylpyrrolidone rapidly upon heating the composition at about 80°–120° C. in the absence of base.

Crosslinked polymers of vinyl pyrrolidone have been used extensively to purify beer and wine solutions. However, it is desired to provide new and improved polymers for use in this industry, particularly for filtering out polyphenols in beer which give it a stale taste.

Accordingly, it is an object of this invention to provide a polymerizable composition of about 50 to about 90% by weight of vinyl pyrrolidone monomer, about 10 to about 50% by weight of vinyl caprolactam monomer, and about 0.5 to about 7% by weight of a crosslinker, which is capable of proliferous polymerization in the absence of base at about 80° to about 120° C.

Another object is to provide a process for making crosslinked copolymers of vinyl pyrrolidone and vinyl caprolactam by (a) providing the polymerizable composition described above, preferably including water, and (b) heating said composition in the absence of base at about 80° to about 120° C. for about 1 to about 10 hours, under vigorous agitation, in an inert atmosphere.

Still another object is to provide a crosslinked copolymer product of vinyl pyrrolidone and vinyl caprolactam.

These and other objects and features of the invention will be made apparent from the following description of the invention.

SUMMARY OF THE INVENTION

What is provided herein is:

(1) A polymerizable composition of about 50 to about 90%, preferably 60–70%, by weight of vinyl pyrrolidone monomer, about 10 to about 50%, preferably 30–40%, by weight of vinyl caprolactam monomer, and about 0.5 to about 7% preferably 1 to 2.5%, by weight of a crosslinker, such as EVP, which composition is capable of proliferous polymerization in the absence of base at about 80° to about 120° C.;

(2) A polymerizable composition as above wherein the crosslinker is generated in situ or added directly to the reaction mixture, e.g. as a powder;

(3) A reaction mixture comprising about 20 to about 90% by weight of a polymerizable composition of vinyl pyrrolidone and vinyl caprolactam monomers, and crosslinker therewith, and about 10 to about 80% by weight of water; and (4) A process for making crosslinked copolymers of vinyl pyrrolidone and vinyl caprolactam which comprises (a) providing the reaction mixture above, and (b) heating the mixture in the absence of base at about 80° to about 120° C. for about 1 to about 10 hours, under vigorous agitation, in an inert atmosphere.

(5) A crosslinked copolymer product of about 50 to 90% by weight of vinyl pyrrolidone and about 10 to about 50% by weight of vinyl caprolactam.

(6) A crosslinked copolymer product as above wherein the crosslinker is present in an amount of about 0.5 to about 7% by weight therein, and is preferably EVP.

DETAILED DESCRIPTION OF THE INVENTION

In accordance with the present invention, a process is provided herein for making crosslinked copolymers of vinyl pyrrolidone and vinyl caprolactam having a vinyl caprolactam content of up to about 50 wt. %. The process of the invention involves forming a predetermined reaction mixture of vinyl pyrrolidone, vinyl caprolactam and a crosslinker, in water, as heat absorber, in the absence of base, at about 80° to about 120° C., preferably about 100° C., while stirring vigorously. Under these process conditions, a proliferous polymerization reaction occurs substantially instantaneously, particularly at low vinyl caprolactam concentrations, and, upon prolonged heating, with a higher vinyl caprolactam content in the copolymer.

The crosslinker may be generated in situ or added to the reaction mixture, e.g. as a powder. Suitable crosslinkers include EVP, EBVP (ethylidene bisvinylpyrrolidone) and N,N'-divinylimidazolidone, triallyl-1,3,5-triazine-2,4,6 (1H, 3H, 5H)-trione, 2,4-6-triallyloxy-1,3,5-triazine and pentaerythythritol triallyl ether. EVP is preferred.

EXAMPLE 1

A 1-l glass Bucchi reactor equipped with a reflux condenser and mechanical stirrer was charged with 110.81 g of vinyl pyrrolidone (VP), 12.31 g of vinyl caprolactam (VCL), 1.875 g of 1-vinyl-3(E)-ethylidene pyrrolidone (EVP) crystals and 31.25 g of water. The reactor was closed at −0.5 bar for a period of 5 minutes. Then nitrogen pressure (to 3 bars) was introduced several times to remove any traces of oxygen.

Then, at 0.14 bar of nitrogen pressure and about 800 rpm agitation, the solution was heated to 100° C. whereupon the proliferous reaction commenced. The peak temperature and induction time of the reaction was recorded. When the temperature of the reactor was observed to be below 120° C. the heating bath then was turned off.

The reaction product was discharged into 4-l of water and soaked overnight. An aliquot then was collected for determination of residual monomer content. The solid crosslinked copolymer product was filtered, washed, and dried in a forced air oven at 70° C. The dry powder was ground to pass through a 40-mesh screen.

Analysis of the aliquot taken and NMR data indicated that the weight composition of the crosslinked copolymer product was 10/90 by weight of vinyl caprolactam to vinyl pyrrolidone.

EXAMPLES 2–4

Reaction mixtures of VP and VCL monomers were charged to the reactor in weight ratios of 20/80, 30/70 and 40/60, as shown in Table 1 below.

TABLE 1

Reaction Mixture

| Ex. No. | VP (g) | VCL (g) | EVP (g) | Water (g) |
| --- | --- | --- | --- | --- |
| 2 | 98.50 | 24.63 | 1.875 | 31.25 |
| 3 | 86.19 | 36.94 | 1.875 | 31.25 |
| 4 | 73.88 | 49.25 | 1.875 | 31.25 |

Only ppm level of unreacted monomers were detected from the filtrates. The popcorn copolymers made from the above ingredients were analyzed by NMR and have chemical composition approximately 20% to 40% of VCL and 80% to 60% VP individually.

TABLE 2

Crosslinked Copolymer Product

| Ex. No. | VP (wt. %) | VCL (wt. %) |
| --- | --- | --- |
| 1 | 90 | 10 |
| 2 | 80 | 20 |
| 3 | 70 | 30 |
| 4 | 60 | 40 |

EXAMPLE 5

The procedure of Example 1 above was followed with a 50/50 weight ratio of a mixture of VCL/VP monomers (61.57 g each of VCL and VP) and 1.875 g of EVP powder as crosslinker and 31.25 g of distilled water. The mixture was heated at 100° C. for 5 hours. Popcorn polymer seeds began to form after the 5th hour. The reaction product then was discharged and cooled to room temperature. The reaction charges are given in Table 3 below and the crosslinked copolymer product is given in Table 4 below.

TABLE 3

Reaction Mixture

| Ex. No. | VP (g) | VCL (g) | EVP (g) | Water (g) |
| --- | --- | --- | --- | --- |
| 5 | 61.57 | 61.57 | 1.875 | 31.25 |

TABLE 4

Crosslinked Copolymer Product

| Ex. No. | VP (wt. %) | VCL (wt. %) |
| --- | --- | --- |
| 5 | 50 | 50 |

EXAMPLES 6–9

An EVP/VP monomer mixture, (5.17% EVP) was formed in situ according to the procedure described in U.S. Pat. 5,391,668, Example 4. The popcorn copolymers then are prepared using the procedure of Example 1 and the reaction charges given in Table 5 below.

TABLE 5

| Ex. No. | EVP/VP MIXTURE (5.17% EVP) (g) | VP (g) | VCL (g) | Water (g) |
| --- | --- | --- | --- | --- |
| 6 | 36.27 | 76.42 | 12.31 | 31.25 |
| 7 | 36.27 | 64.09 | 24.63 | 31.25 |
| 8 | 36.27 | 51.80 | 36.94 | 31.25 |
| 9 | 36.27 | 39.49 | 49.25 | 31.25 |

While the invention has been described with particular reference to certain embodiments thereof, it will be understood that changes and modifications may be made which are within the skill of the art. Accordingly, it is intended to be bound only by the following claims, in which:

What is claimed is:

1. A polymerizable composition consisting essentially of about 50 to about 90% by weight of vinyl pyrrolidone monomer, about 10 to about 50% by weight of vinyl caprolactam monomer, and about 0.5 to about 7% by weight of a crosslinker, which composition is capable of proliferous polymerization in the absence of base at about 80° to about 120° C.

2. A reaction mixture comprising about 20 to about 90% by weight of the polymerizable composition of claim 1, and about 10 to about 80% by weight of water.

3. A polymerizable composition according to claim 1 wherein the crosslinker is generated in situ or added as a powder.

4. A crosslinked copolymer product comprising about 50 to about 90% by weight vinyl pyrrolidone and about 10 to about 50% by weight of vinyl caprolactam.

5. A product of claim 4 containing about 0.5 to 7% by weight of a crosslinker.

6. A product according to claim 5 wherein said crosslinker is EVP.

7. A crosslinked copolymer product according to claim 5 comprising about 60–70% by weight vinyl pyrrolidone and 30–40% by weight vinyl caprolactam.

8. A crosslinked polymer product according to claim 7 including 1–3% of the crosslinker.

* * * * *